US012803207B2

(12) United States Patent
Schnörch et al.

(10) Patent No.: US 12,803,207 B2
(45) Date of Patent: Nov. 17, 2026

(54) ELECTRICAL CONNECTION STRUCTURE FOR CONDUCTOR FORMED ON GLASS SURFACE

(71) Applicants: AGC GLASS EUROPE, Louvain-la-Neuve (BE); KLAUKE SLOVAKIA SRO, Dolný Kubín (SK)

(72) Inventors: Peter Schnörch, Brussels (BE); Juraj Majkut, Oravsky Podzamok (SK); Gustav Majtan, Turany (SK); Jozef Kravsky, Kriva (SK)

(73) Assignees: AGC GLASS EUROPE, Louvain-la-Neuve (BE); KLAUKE SLOVAKIA SRO, Dolný Kubín (SK)

( * ) Notice: Subject to any disclaimer, the term of this patent is extended or adjusted under 35 U.S.C. 154(b) by 339 days.

(21) Appl. No.: 18/578,217

(22) PCT Filed: Jul. 14, 2022

(86) PCT No.: PCT/EP2022/069804
§ 371 (c)(1),
(2) Date: Jan. 10, 2024

(87) PCT Pub. No.: WO2023/285626
PCT Pub. Date: Jan. 19, 2023

(65) Prior Publication Data

US 2024/0322478 A1 Sep. 26, 2024

(30) Foreign Application Priority Data

Jul. 16, 2021 (EP) .................................... 21186247

(51) Int. Cl.
*H01R 13/24* (2006.01)
*H01R 12/71* (2011.01)
*H01R 13/193* (2006.01)

(52) U.S. Cl.
CPC ....... *H01R 13/2407* (2013.01); *H01R 12/714* (2013.01); *H01R 13/193* (2013.01); *H01R 2201/26* (2013.01)

(58) Field of Classification Search
CPC .............. H01R 13/2407; H01R 13/193; H01R 12/714; H01R 2201/26
(Continued)

(56) References Cited

U.S. PATENT DOCUMENTS 4,023,008 A 5/1977 Durussel
6,676,438 B2 * 1/2004 Zhou .................. G01R 1/06733 439/482

(Continued)

FOREIGN PATENT DOCUMENTS

JP 10-40977 A 2/1998

OTHER PUBLICATIONS

International Search Report issued Oct. 19, 2022 in PCT/EP2022/069804, filed on Jul. 14, 2022, 3 pages.

*Primary Examiner* — Gary F Paumen
(74) *Attorney, Agent, or Firm* — Oblon, McClelland, Maier & Neustadt, L.L.P.

(57) ABSTRACT

An electrical connection structure for a conductor formed on a glass surface, including a conductor formed on a glass surface, a housing having a cover member provided to cover at least a part of the conductor, forming a cavity between the cover member and the glass surface and having an insertion slot in communication with the cavity, and a connection member inserted into the insertion slot made of an electrically conductive material having elasticity. The connection member presses the conductor by being elastically deformed in the cavity whereby the connection member and the conductor are electrically connected. The cover member includes a releasable plate-shaped ceiling forming in its
(Continued)

open position an angle ($\alpha$) between the glass surface and the cover member from 15 to 135°.

13 Claims, 4 Drawing Sheets

(58) Field of Classification Search
USPC .......................................................... 439/55
See application file for complete search history.

(56) References Cited

U.S. PATENT DOCUMENTS

| | | | | |
|---|---|---|---|---|
| 9,960,510 | B2 * | 5/2018 | Shiraishi ................ | H01R 31/00 |
| 2002/0048973 | A1 * | 4/2002 | Zhou .................. | G01R 1/06711 257/E23.021 |
| 2017/0338575 | A1 | 11/2017 | Shiraishi et al. | |
| 2021/0028571 | A1 * | 1/2021 | Kitade ................. | H01R 12/718 |

* cited by examiner

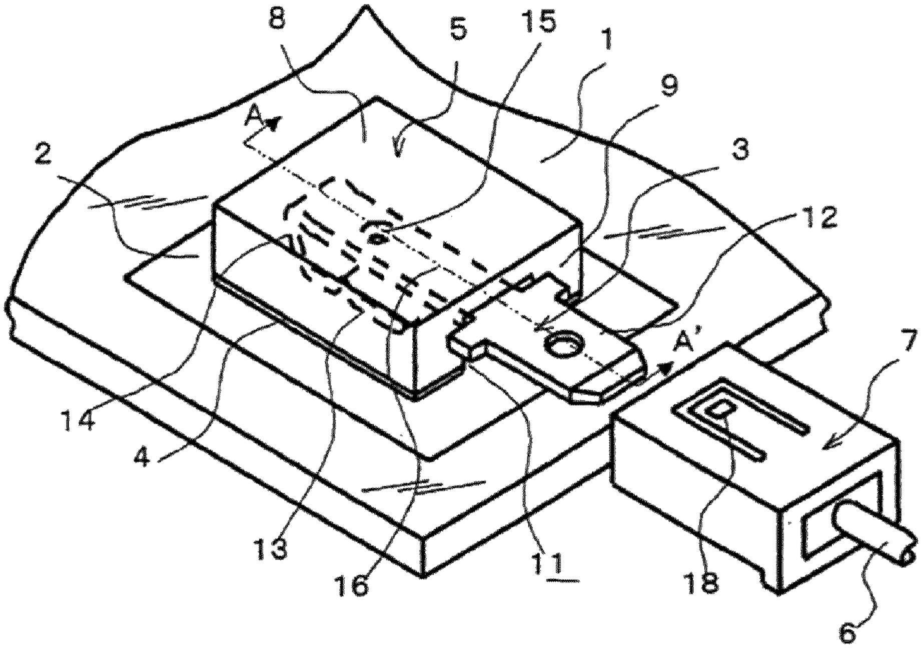
Fig.1 – prior art
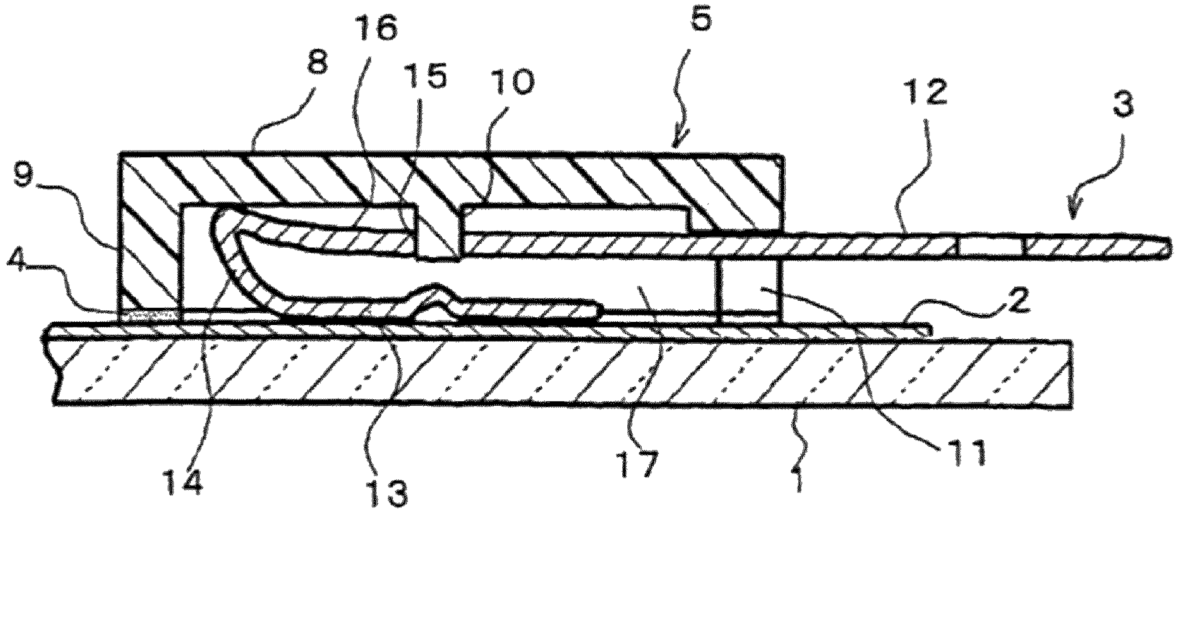
Fig.2 – prior art

ELECTRICAL CONNECTION STRUCTURE FOR CONDUCTOR FORMED ON GLASS SURFACE

CROSS REFERENCE TO RELATED APPLICATIONS

This application is a National Stage entry under 35 U.S.C. § 371 of PCT/EP2022/069804, filed on Jul. 14, 2022, and claims priority to EP Patent Application No. 21186247.9, filed on Jul. 16, 2021, the entire contents of which are incorporated herein by reference.

TECHNICAL FIELD

The present invention relates to an electrical connection structure for a conductor formed on a glass surface, for electrically connecting a conductor formed on a glass surface with a lead wire.

BACKGROUND ART

Various functions are added to a window glass for automobiles in recent years. In particular, to a rear window glass, an antenna function for receiving e.g. AM, FM or TV waves, or a defog function for defogging the window glass, is added by forming a baked silver paste on the glass surface. In order to exhibit these functions, it is necessary to supply electricity via a bus bar portion made of a baked silver paste. The supply of electricity is achieved by soldering a terminal having a shape shown as PA or PV type flat-type male terminal for automobiles to the bus bar portion, and by connecting a connector connected with a lead wire, with the terminal.

Today, conventional structure with a terminal is soldered to a baked silver paste and connected with a lead wire. In this case, the baked silver paste and the lead wire can be connected by connecting a connector with the lead wire and connecting the connector with the terminal. Further, by pressing a switch provided on the connector, the connector can be disconnected from the terminal.

Since the terminal is attached to the baked silver paste by soldering, there is a risk that the strength of the glass can be reduced by a thermal shock at the time of soldering.

Further, as in the ELV (End Life of Vehicle) order and WHEE&RoHS (Waste Electrical and Electronic Equipment & Restriction of the use of certain Hazardous Substances in electrical and electronic equipment) order in Europe, for example, regulations of use of a solder containing lead are being considered in many countries and it is becoming impossible to use a solder containing lead.

Further, since the terminal is attached to the bus bar portion in a bare state, it affects the external appearance and it is requested to improve the design.

Therefore, a connection method of a terminal without employing a solder has been requested and proposed. For example, the specification of U.S. Pat. No. 4,707,591 discloses a method of pressing a bus bar portion of a glass surface against a contactor attached to a body-flange of an automobile and having a coil spring, to strongly contact the contactor with the bus bar portion by a reaction force of the coil spring so as to electrically connect them.

Further, JP-A-10-40977 discloses a method of bonding a base member to a bus bar portion on a glass surface, making an intervening terminal contact with the bus bar portion, placing a pressing member on the intervening terminal and fitting a cover member to the base member, so that by a pressing force of the pressing member, the intervening terminal is pressed against and held by the bus bar portion, to obtain an electrical connection with the bus bar portion.

However, according to the invention described in the specification of U.S. Pat. No. 4,707,591, the structure of the body becomes complicated in attaching the contactor to the body flange, and since there is an individual difference of glass sheets in the radius, the degree of pressing of the contactor against the bus bar portion changes, which has been making the design of body complicated. Further, it has been necessary to consider a short circuit with the body.

The invention described in JP-A-10-40977 does not have the problem as in the invention described in the specification of U.S. Pat. No. 4,707,591 since it does not use the body. However, since the structure is composed of many parts and its assembly is complicated, it costs much, and insertion and pulling-off of the intervening terminal is difficult.

Under these circumstances, it is an object of the present invention to provide an electrical connection structure for a conductor formed on a glass surface, which electrically connects the conductor formed on a glass surface with a lead wire without requiring soldering, and which comprises a small number of parts, with no risk of glass scratching during the plug-in and achieves space-saving and low cost.

DISCLOSURE OF THE INVENTION

The present invention provides, in order to solve the above problems, an electrical connection structure for a conductor formed on a glass surface, comprising a conductor formed on a glass surface, a housing having a cover member provided to cover at least a part of the conductor, forming a cavity between the cover member and the glass surface and having an insertion slot in communication with the cavity, and a connection member inserted into the insertion slot made of an electrically conductive material having elasticity, wherein the connection member presses the conductor by being elastically deformed in the cavity, whereby the connection member and the conductor are electrically connected.

Thus, the present invention proposes, the housing comprises a releasable upper cover part forming in its open position an angle (α) between the bottom part of the housing and the upper cover part from 15 to 135° and more preferably from 30° to 70° and more and more preferably from 35° to 55°. The present invention is based on an idea of providing an openable cover member on a glass surface, inserting a connection member into a cavity formed by the cover member so as to elastically deform the connection member and pressing a conductor formed on a glass surface with the connection member to make them contact electrically. Since the above-mentioned construction does not require soldering, various problems caused by employing solder can be solved, and exchange of the parts is easy.

Further, it is preferred that the electrical connection structure for a conductor formed on a glass surface comprises a releasable upper cover part forming in its open position an angle (α) between the bottom part of the housing and the upper cover part from 30° to 70° and preferably from 35° to 55°.

Further, it is preferred that the electrical connection structure for a conductor formed on a glass surface according to anyone of preceding claims, wherein the conductor formed on the glass contains a vapor deposited, printed-on, or glued-on metal, a metal compound, a metal alloy, a baked silver paste, or an electrically conductive polymer.

Further, it is preferred that the electrical connection structure for a conductor formed on a glass surface according to anyone of preceding Claim 1, wherein the bottom part of the housing is fixed on the glass by an adhesive or a glue.

Further, it is preferred that the cover member and the connection member have respectively a structure fitting or engaging with each other. By fitting or engaging the cover member of the housing and the connection member with each other, disconnection of the connection member due to an external force can be prevented and the connection between the connection member and the conductor can be stabilized.

Further, it is preferred that one end of the connection member has elasticity and the other end of the connection member is a male type or female type terminal for a connector connected with a lead wire. When the connection member has a male type or female type terminal used conventionally, a conventional connector of a lead-wire-side can be used and no procurement of new parts or capital investment is necessary.

Or else, it may be such that one end of the connection member has elasticity and the other end of the connection member is connected with a lead wire by caulking. If the connection member is directly connected with a lead wire, it is possible to reduce the number of parts and lower the cost.

Further, it is preferred that a contact portion of the connection member to be in contact with the conductor is applied with a metal plating at the surface. By applying the connection member with a metal plating, it becomes possible to stabilize the connection with the conductor for long period of time.

Further, the conductor is preferably of a baked/fired silver paste, and the conductor is preferably formed on a window glass for automobiles. Since conductors made of a baked silver paste provided on many window glasses for automobiles, are connected with terminals by soldering, various problems due to employing of solder can be solved by applying the construction of the present invention.

The present invention provides an electrical connection structure for a conductor on a glass surface, without employing solder.

BRIEF EXPLANATION OF THE DRAWINGS

FIG. 1: a perspective view showing an embodiment of the present invention employing a conventional connector.

FIG. 2: a cross sectional view along a line A-A' of FIG. 1.

BEST MODE FOR CARRYING OUT THE INVENTION

Figure 3A:
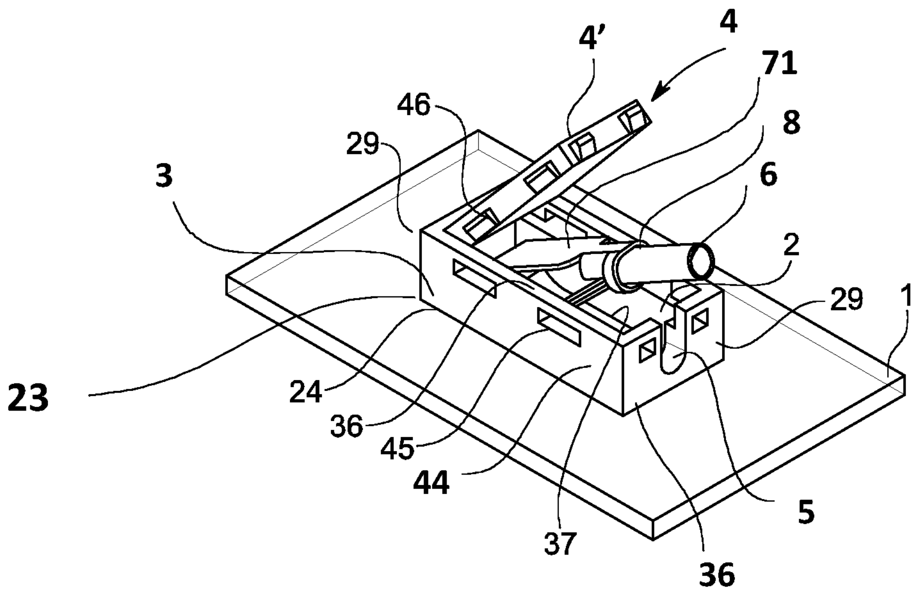
FIGS. 3*a* and 3*b*: respectively a perspective view and a cross sectional view along a line A-A' of FIG. 3*a* showing an embodiment of the present invention.

Now, an embodiment of the present invention will be described with employing drawings.

FIG. 1 is a perspective view showing an example of Embodiment 1 employing a conventional connector of lead-wire-side as it is, and FIG. 2 is a cross sectional view along a line A-A' of FIG. 1. As shown in FIGS. 1 and 2, Embodiment 1 is constituted by a glass sheet 1 on which a conductor 2 is formed, a terminal member 3 made of an electrically conductive material, a cover member 5 pressing and holding by engagement the terminal member 3 and bonded to the glass surface 1 and/or the conductor 2 via an adhesive layer 4 so as to cover at least a part of the conductor 2, and a connector 7 for a terminal member 3 connected with an end of a lead wire 6.

The cover member 5 bonded to the glass surface 1 and/or the conductor 2 via the adhesive layer 4, is constituted by a plate-shaped ceiling 8, a side wall 9 extending vertically from the periphery of the ceiling 8 and bonded to the glass surface 1 and/or the conductor 2 via an adhesive layer 4, a fitting portion 10 having a protrusion at the centre of a surface of the ceiling 8 on a side of the side wall 9, and an insertion slot 11 formed by providing a gate-shaped notch on a part of the side wall 9 for inserting a terminal member 3 into the cover member 5.

One end of the terminal member 3 is constituted by a terminal 12 of PA or PB type, and the other end of the terminal member 3 is constituted by a contact portion 13 to be in contact with the conductor 2, an elastic portion 14 having elasticity, and an insertion portion 16 having a fitting hole 15 for positioning the cover member 5 by being fitted to the fitting portion 10 of the cover member 5 and holding the cover member 5.

The elasticity of the elastic portion 14 can be obtained by forming the insertion portion 16 to have a substantially actuate cross-sectional shape so as to have elasticity in a direction perpendicular to the conductor 2. Further, the height of the elastic portion 14 in a free space is higher than the height of the cavity 17 formed between the cover member 5 and the conductor 2.

The elasticity of elastic portion 14 is used for connecting the terminal member 3 and the cover member 5. The insertion portion 16 is forced into the insertion slot 11 under elastic deformation of the elastic portion 14 until the height of the elastic portion 14 becomes lower than the height of the insertion slot 11, and the fitting portion 10 of the cover member 5 and the fitting hole 15 of the insertion portion 16 are fit and fixed together. The fitting serves as positioning, and the insertion portion 16 is pressed against the conductor 2 and the ceiling 8 by a reaction force of the elastic portion 14, whereby the insertion portion 16 does not disengage from the fitting with the cover member 5. Further, the contact portion 13 is strongly pressed against the conductor 2 by the reaction force of the elastic portion 14, whereby a stable connection can be obtained. Therefore, by making the construction of the present invention, the conductor 2 and the terminal member 3 can be electrically connected without employing solder.

Meanwhile, the connector 7 on the side of the wire 6 is a female-type connector complying with type plug receptacle for automobiles which has been conventionally used. By connecting the connector with the terminal 12 of the terminal member 3, the lead wire 6 and the conductor 2 on the glass sheet 1 can be connected.

Figure 3B:
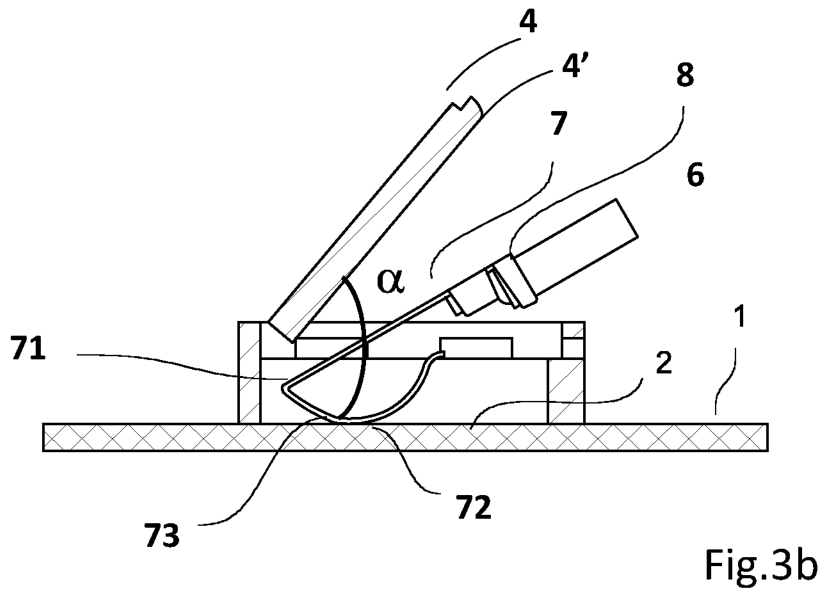

FIG. 3A is a perspective view showing an example of embodiment according to the present invention, and FIG. 3B is a cross sectional view along a line B-B' of FIG. 3 in a state that the insertion member 72 of the connection element 7 is partially inserted. The same reference numerals are used for the parts in common with FIG. 1 or 2. As shown in FIGS.

3 to 5, this embodiment shows a glass sheet 1 on which a conductor 2 is formed, a connection member 7 provided at an end of a wire 6 made of an electrically conductive material, and a cover member 4 for pressing and latching the connection member 7, and bonded to the surface of the glass sheet 1 or/and the conductor 2 by pressing the connection element 7 on the conductor 2.

The cover member 4 of the housing 3 bonded by its bottom part 23 to the surface of the glass sheet 1 or/and the conductor 2 via the adhesive layer 24, is constituted by a plate-shaped ceiling 5, a side wall 29 vertically extending from the periphery of the ceiling 5 (cover member) and bonded to the surface of the glass sheet 1 and/or the conductor 2 via the adhesive layer 24, an insertion slot 9 formed by providing a gate-shaped notch at a part of the side wall 29 and allowing insertion of the insertion member 71 of the connection member 7 into the cover member 5, and a cover-member-side engage portion formed by making the height of the insertion slot 9 lower than the height of the cavity 9 formed between the cover member 5 and the glass sheet 1.

According to the present invention, the cover member 5 of the housing 3 provided to cover at least a part of the conductor 2, forms a cavity 9 between the cover member 5 of the housing 3 and the glass surface 1 and has an insertion slot 5 in communication with the cavity 9, and a connection member 23 inserted into the insertion slot 31 made of an electrically conductive material having elasticity. The connection member presses the conductor 2 by being elastically deformed in the cavity 37 whereby the connection member and the conductor are electrically connected.

According to the present invention, the cover member 5 of the housing 3 comprises a releasable plate-shaped ceiling forming in its open position an angle (α) between the bottom part of the housing and the upper cover part from 15 to 135° and more preferably from 30° to 70° and more and more preferably from 35° to 55°. Thus, thanks to the present invention, the processability is increased since there is no need to pick and place releasable plate-shaped ceiling. Thus, the time needed to place the connection member and to close the cover member of the housing is reduced leading to timing and cost saving.

One end of the connection member 7 comprises an insertion member 71 having at one end a caulking portion (crimp) 8 to be connected with a lead wire 6 by caulking and having a plate-shaped portion at the other end. The insertion member 71 bonded to the glass 1 is constituted by a contact portion 72 to be in contact with the conductor 2 and an elastic portion 73 having elasticity.

The elasticity of the elastic portion 73 can be obtained by forming the insertion member 71 to have a substantially actuate cross sectional shape so as to have elasticity in a vertical direction with respect to the conductor 2. Further, the height of the elastic member 73 in a free space is higher than the height of the cavity 9 formed between the cover member 4 of the housing 3 and the conductor 2.

To connect the connection member 7 and the cover member 4, the elasticity of the elastic portion 73 is used and the pressure on the terminal member 71 by the releasable plate-ceiling 4 of the cover. The insertion member 71 is forced into the insertion slot 5 under elastic deformation of the elastic portion 73 until the height of the elastic portion 73 becomes lower than the height of the insertion slot 5, and the cover-member-side engage portion 4 and the terminal-side engage portion 71 of the connection member 7 are engaged together. After the insertion, the insertion member 71 is pressed against the conductor 2 and the ceiling 4 by the reaction force of the elastic portion 73, whereby it does not disengage from the fitting with the cover member 4. Further, the contact portion 72 is strongly pressed against the conductor 2 by the reaction force of the elastic portion 73, which provides a stable connection. Therefore, according to the construction of the present invention, the conductor 2 and the connection member 23 are electrically connected without using a solder.

According to the present invention, the shape and the size of the cover member 4 and the terminal member 71 of the connection element 7 and the connection member 7 are not limited to those described above. For example, the external shapes of the cover member 4 may be round shapes to escape from an external force even if it is applied thereto, or to improve their design. Further, the cover member 4 may have a structure in which a plurality of the terminal member can be inserted. Further, the fitting and engaging structure of each of the cover member 4 and connection member 25 are not limited to those described above.

The material of the cover member 4 is not particularly limited and is determined considering the durability or adhesiveness with the adhesive material forming the adhesive layer 24. For example, a polyamide resin is mentioned. Further, the production process may be a cutting or an injection molding and not particularly limited.

The adhesive layer 24 may, for example, be a double-sided adhesive material (double-sided tape), a thermosetting adhesive agent or a thermoplastic adhesive agent. One having a durability sufficient for long time use against the elasticities of the connection member 7, should be selected. When a double-sided adhesive material is employed, the thickness of the adhesive layer is determined considering the size of the connection member 7 within a range in which the elasticity of the elastic portion 73 can be used. In a case of using an adhesive agent, attention be paid to prevent it from flowing out on the conductor 2 or to prevent it from generating a gas affecting the connection member 7, the conductor 2 and contact between them. Therefore, a double-sided adhesive material is more preferable considering the productivity and workability.

Material of the connection member 7 are not particularly limited so long as it is an electrically conductive material. However, considering the long-term stability or the compatibility with the conductor 2, at least the contact portion 33 are preferably applied by plating of a metal such as silver, tin or nickel. Particularly, the contact portion 72 to be in contact with these conductors 2 are preferably applied by metal plating. For the metal plating, it is preferred to consider the material of the conductor 2 and environmental impact at a time of disposal. In particular, when the conductor 2 is a conductor formed by baking a silver paste, silver plating is preferred.

Now, Examples are specifically described. Example 1 is an example of prior art, and Example 2 is an example according to the present invention.

Example 1 as Conventional Connector

A cover member 5 having the shape shown in FIGS. 1 and 2 was made by cutting a polyamide resin having a size of 18 mm×12 mm and a thickness of 4 mm. Further, as an adhesive layer 4, a double-sided adhesive tape (manufactured by Sumitomo 3M Limited) of 0.4 mm thick cut into a shape corresponding to the bonding surface of the cover member 5, was employed to bond the cover member 5 at a predetermined position of the conductor 2 formed by baking a silver paste on a glass sheet 1.

The terminal member 3 comprises an insertion portion made of a beryllium copper of 0.3 mm thick and a terminal portion 12 made of a bronze of 0.8 mm thick welded to the insertion portion. The terminal portion 3 has a size complying with PA type male blade (with shoulders) for automobiles. The insertion portion has a width of 4.5 mm, a length of 10 mm and a height in a free space of 3.0 mm.

The terminal member 3 was inserted into the insertion slot 11 by pushing the insertion portion 16 under elastic deformation of the elastic portion 14 until the height of the elastic portion 14 becomes lower than the height of the cover member 5 at the insertion slot 11, and until the fitting portion 10 of the cover member 5 and the fitting hole 15 of the insertion portion 16 were fit together to be fixed.

In this state, the contact resistance between the conductor 2 and the terminal member 3 was measured and found it to be at most 0.005 Ω which was sufficient for practical use even as compared with conventional examples, and the contact resistance remained good even through an environmental test.

Example 2 According to the Present Invention

A cover member 4 of the housing 3 having the shape shown in FIGS. 3 to 5 was made by cutting a polyamide resin having a size of 16 mm×15 mm and a thickness of 2.6 mm. Further, as an adhesive layer 24, a double-sided adhesive tape of 0.4 mm thick cut into a shape corresponding to the bonding surface of the cover member 25, was employed to bond the cover member 25 at a predetermined position of a conductor 2 formed by baking a silver paste on a glass sheet 1.

Figure 4A:
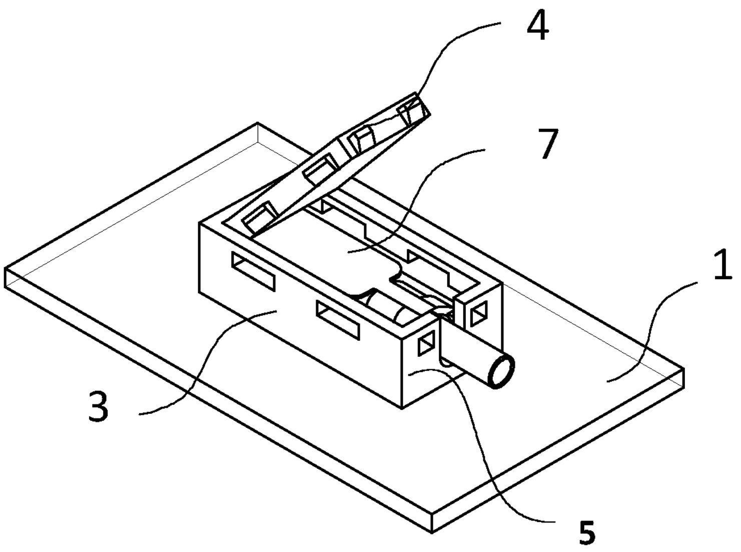
FIGS. 4*a* and 4*b*: respectively a perspective view and a cross sectional view along a line A-A' of FIG. 3 in a state that a terminal member is inserted into an insertion slot wherein the releasable plate-shaped ceiling is in open position.
Figure 4B:
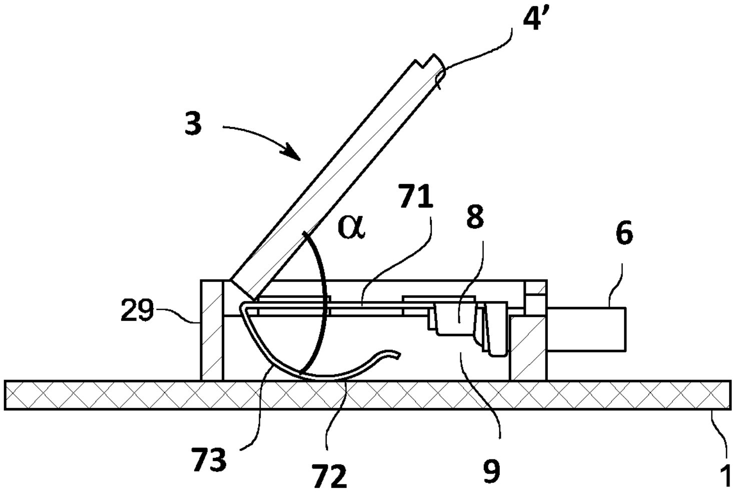

The connection member 7 comprises an insertion member 71 made of a beryllium copper of 0.2 mm thick and a caulking portion 8 made of bronze of 0.3 mm thick welded to the insertion member. The insertion member 71 has a width of 4.3 mm, a length of 10 mm and a height in a free space of 2.5 mm. Further, the caulking portion 8 has a length of 10 mm, a width of about 3.5 mm and a height of about 3 mm when it is caulked together with a lead wire 26. According to the present invention, the insertion member 71 may be made of Stainless steel (preferably plated with silver or gold or nickel and tin) or made of Beryllium-Copper or Zirconium-Copper The connection member 7 was inserted into the cavity 9 and into the insertion slot 5 of the cover member 4 by placing the insertion member 71 under elastic deformation of the elastic portion 73 until the height of the elastic portion 73 became lower than the height of the cover member 4 at the insertion slot 5, and until the cover-member-side engage portion and the insertion member 71 were engaged together. The releasable plate-shaped ceiling 4 in its open position allows to insert the connection member 7 in an easy way into the cavity 9 and into the insertion slot 5 as shown in FIGS. 4*a* and 4*b*. As shown in the FIG. 4A, the releasable plate-shaped ceiling (4') forms in its open position an angle (α) between the glass surface (1) and the cover member of 50-60° °. It is understood that the open position an angle (α) between the glass surface (1) and the cover member may be from 15 to 135° and more preferably from 30° to 70° and more and more preferably from 35° to 55°.

Figure 5A:
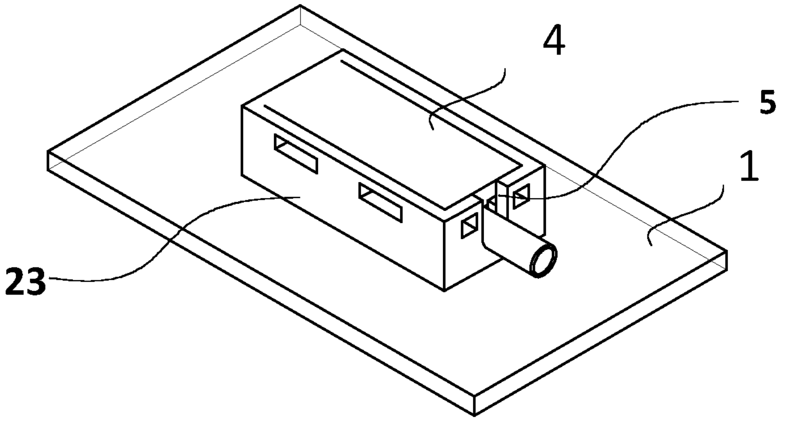
FIGS. 5*a* and 5*b*: respectively a perspective view and a cross sectional view along a line A-A' of FIG. 3 in a state that a terminal member is inserted into the cavity and wherein the releasable plate-shaped ceiling is in closed position.
Figure 5B:
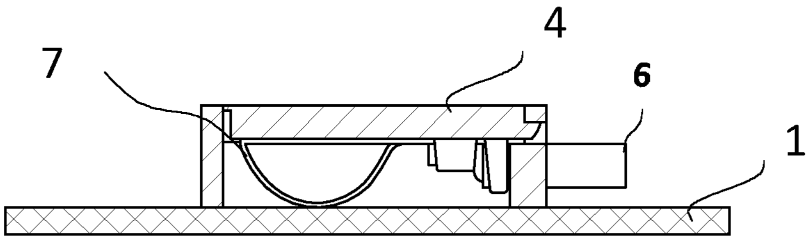

Once, the connection member 7 inserted into the into the cavity 9 and into the insertion slot 5 of the cover member 4, the releasable plate-shaped ceiling 4 is pushed down to close the cover member 4 as shown in FIGS. 5*a* and 5*b*. After the insertion, the connection member 7 is pressed against the conductor 2 and the ceiling 4 by the reaction force of the elastic portion 73, whereby it does not disengage from the fitting with the cover member 4. Further, the contact portion 72 is strongly pressed against the conductor 2 by the reaction force of the elastic portion 34, which provides a stable connection. Therefore, according to the construction of the present invention, the conductor 2 and the connection member 7 are electrically connected without using a solder.

According to one embodiment of the present invention, the cover member 4 has notches 45 in its lateral walls 44 and the plate-shaped ceiling 4 of the cover member is provided with protrusions (locking element) 46 designed to be engaged into the notches 44 to maintained plate-shaped ceiling 28 in a closed position and well maintaining the connection member 7 in contact with the conductor 2. It is understood, that the notches and protrusions are designed to fit together.

In this state, the contact resistance between the conductor 2 and the connection member 23 was measured and found it to be at most 0.005Ω which was sufficient for practical use even as compared with conventional examples, and the contact resistance remained good even through an environmental test.

INDUSTRIAL APPLICABILITY

As described above, the present invention provides the following effects. A cover member is bonded to a conductor in advance. Therefore, by simply inserting a terminal member, the terminal member can be pressed against the conductor due to the elasticity of the terminal member to realize a stable electrical connection. Further, since the cover member comprises a releasable plate-ceiling, the terminal member may be inserted very easily into the cover member and may be efficiently in contact with conductor. Further, since the structure is simple and constituted by a small number of parts, the work can be simplified, the cost can be kept low and space can be saved since the connection structure is small-sized.

Further, since an electrical connection with the conductor formed on a glass surface can be achieved without using a solder, it becomes unnecessary to consider the disposal process of solder, which contributes to cut the cost for disposal process and prevents lowering of the strength of the glass due to a thermal shock caused by soldering. Further, since the terminal is not bare as in the case of soldering, external appearance can be improved.

The invention claimed is:

1. An electrical connection structure for a conductor formed on a glass surface, comprising:

a conductor formed on the glass surface;

a housing having a cover member provided to cover at least a part of the conductor, forming a cavity between the cover member and the glass surface and having an insertion slot in communication with the cavity; and a connection member inserted into the insertion slot made of an electrically conductive material having elasticity, wherein the connection member presses the conductor by being elastically deformed in the cavity whereby the connection member and the conductor are electrically connected, wherein the cover member comprises a releasable plate-shaped ceiling forming in its open position an angle between the glass surface and the cover member from 15 to 135°, and wherein in the open position, the cover member allows the connection member to be inserted into the cavity.

2. The electrical connection structure according to claim 1, wherein the angle is from 30° to 70°.

3. The electrical connection structure according to claim 1, wherein the conductor formed on the glass surface contains a vapor deposited, printed-on, or glued-on metal, a metal compound, a metal alloy, a baked silver paste, or an electrically conductive polymer.

4. The electrical connection structure according to claim 1, wherein a bottom part of the housing is fixed on the glass surface by an adhesive or a glue.

5. The electrical connection structure according to claim 1, wherein the cover member and the connection member have respectively a structure fitting or engaging with each other.

6. The electrical connection structure according to claim 1, wherein an end of the connection member has elasticity and another end of the connection member is a male type or female type terminal for a connector connected with a lead wire.

7. The electrical connection structure according to claim 1, wherein an end of the connection member has elasticity and another end of the connection member is connected with a lead wire by caulking.

8. The electrical connecting structure according to claim 1, wherein a contact portion of the connection member to be in contact with the conductor, in which metal plating is applied on the contact portion.

9. The electrical connecting structure according to claim 1, wherein the conductor comprises a baked silver paste.

10. The electrical connection structure according to claim 1, wherein the conductor is formed on a window glass for automobiles.

11. The electrical connecting structure according to claim 1, wherein the electrical connecting structure is formed on the inner face of a window glass for automobiles.

12. The electrical connection structure according to claim 1, wherein the angle is from 35° to 55°.

13. The electrical connection structure according to claim 1, wherein the insertion slot is formed as a notch at a part of a side wall of the housing, and a height of the insertion slot is lower than a height of the cavity formed between the cover member and the glass sheet.

* * * * *